United States Patent
Sugiyama

(10) Patent No.: US 10,161,648 B2
(45) Date of Patent: Dec. 25, 2018

(54) ELECTRONIC DEVICE

(71) Applicant: DENSO WAVE INCORPORATED, Chita-gun, Aichi-pref. (JP)

(72) Inventor: Wataru Sugiyama, Chita-gun (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 9 days.

(21) Appl. No.: 15/184,597

(22) Filed: Jun. 16, 2016

(65) Prior Publication Data

US 2017/0010711 A1 Jan. 12, 2017

(30) Foreign Application Priority Data

Jul. 8, 2015 (JP) .................... 2015-136931

(51) Int. Cl.
| | |
|---|---|
| G06F 3/041 | (2006.01) |
| F24F 11/30 | (2018.01) |
| G06F 3/0488 | (2013.01) |
| G06F 3/039 | (2013.01) |
| G06F 3/044 | (2006.01) |
| F24F 11/52 | (2018.01) |

(52) U.S. Cl.
CPC .............. *F24F 11/30* (2018.01); *G06F 3/039* (2013.01); *G06F 3/0488* (2013.01); *F24F 11/52* (2018.01); *G06F 3/044* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 2015/0145815 A1* | 5/2015 | Morrson | G06F 3/044 345/174 |
| 2015/0160760 A1* | 6/2015 | Sato | G06F 3/044 345/174 |
| 2015/0234502 A1 | 8/2015 | Kubo et al. | |
| 2016/0357321 A1* | 12/2016 | Ito | G06F 3/044 |

* cited by examiner

*Primary Examiner* — Joseph R Haley
(74) *Attorney, Agent, or Firm* — Oliff PLC

(57) ABSTRACT

An electronic device includes a touch panel having a detection region and a transparent electrode sheet disposed in such a manner that at least a part of the transparent electrode sheet overlaps the detection region of the touch panel and including a transparent sheet, an operation electrode, and a detection electrode. The operation electrode and the detection electrode are made of a transparent conductive material and are disposed on the transparent sheet. The operation electrode is located outside the detection region in a state where the transparent electrode sheet overlaps the touch panel. The detection electrode is electrically connected to the operation electrode and is located inside the detection region in the state where the transparent electrode sheet overlaps the touch panel.

7 Claims, 6 Drawing Sheets

FIG. 8A
FIG. 8B
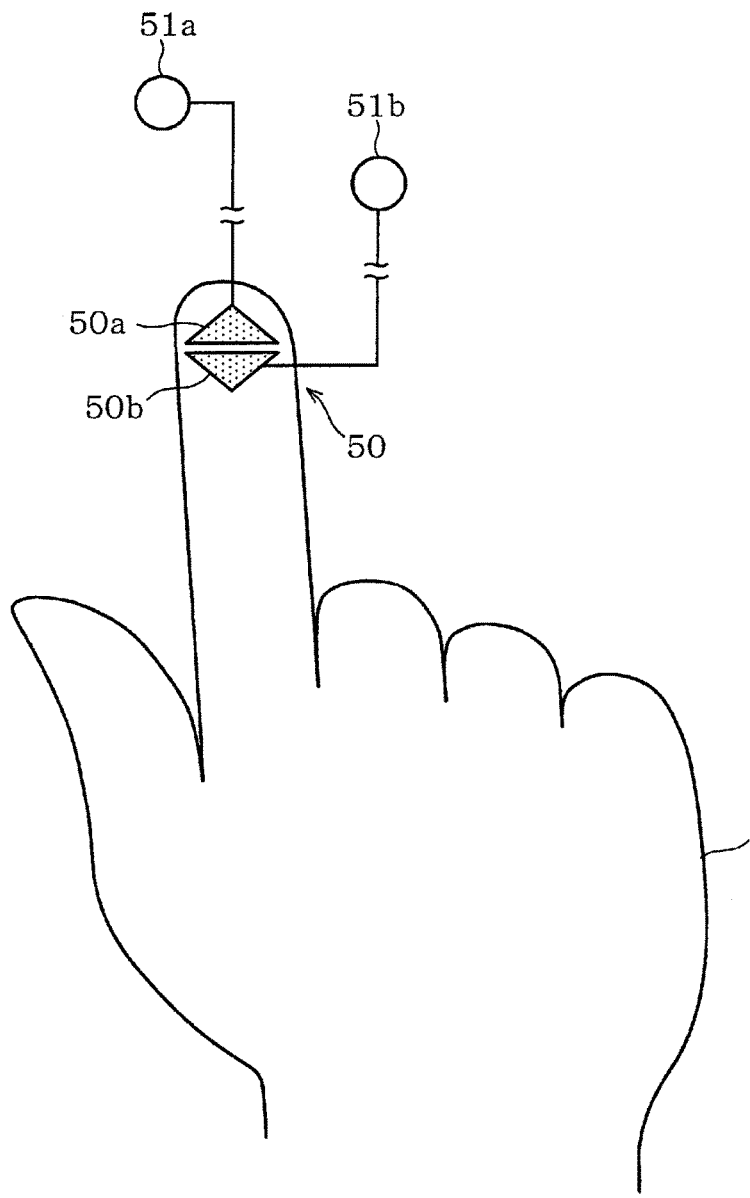
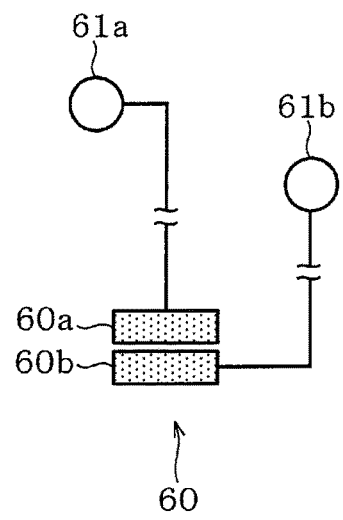

ELECTRONIC DEVICE

CROSS REFERENCE TO RELATED APPLICATIONS

The present application is based on Japanese Patent Application No. 2015-136931 filed on Jul. 8, 2015, the disclosure of which is incorporated herein by reference.

TECHNICAL FIELD

The present disclosure relates to an electronic device including a touch panel.

BACKGROUND

In an electronic device including a touch panel, an operation of a user is basically input to a detection region of the touch panel. Thus, when an operation to an outside of the detection region of the touch panel needs to be detected, a dedicated switch is provided or a touch panel having a second detection region is employed, for example, as described in JP 2014-63520 A (corresponding to US 2015/0234502 A1).

In some cases, electronic devices are not designed differently for each product, and are designed so that casings or components are standardized in consideration of versatility to same extent. Hereafter, a design in consideration of versatility is conveniently referred to as a versatile design. In cases of the electronic devices having the versatile design, because the casings or the components are standardized, a significant reduction of a manufacturing cost and a component cost can be expected. On the other hand, due to the versatile design, a situation that the electronic devices do not meet the requirement of each customer as they are is supposed. For example, when a customer requests to provide an operation position outside a detection region of a touch panel, there is a possibility that an electronic device of the versatile design cannot meet the request as it is. If an electronic device is completely newly designed including a casing, the electronic device can meet the request, for example, by employing the touch panel described in JP 2014-63520 A.

However, if the electronic device is completely newly designed, the cost is significantly increased, and the versatile design becomes meaningless. However, if a touch panel having a detection region that is large enough to cover a front surface of the casing is used, because a size of the casing does not change, a wiring space for the touch panel may not be secured. In a case where a new operation position is provided as a variation of an existing electronic device, when a size of the detection region of the touch panel changes, coordinate axes for detecting a touch operation also change. Thus, a software needs to be changed. Also in a case where a switch is provided at a new operation position, a significant change of a software and a hardware is necessary. In this way, in the electronic devices of the versatile design, there are various factors that hinder a design change, and a configuration for detecting an operation to an operation position outside the detection region of the touch panel could not reach a level that can be called as a versatile design.

SUMMARY

An object of the present disclosure is to provide an electronic device in which a configuration for detecting an operation to an operation position located outside a detection region of a touch panel is applicable to a versatile design.

An electronic device according to an aspect of the present disclosure includes a touch panel and a transparent electrode sheet. The touch panel has a detection region which is predetermined and detects an operation by an electrostatic capacitance system. The transparent electrode sheet is disposed in such a manner that at least a part of the transparent electrode sheet overlaps the detection region of the touch panel, and includes a transparent sheet, an operation electrode, and a detection electrode. The operation electrode and the detection electrode are made of a transparent conductive material and are disposed on the transparent sheet. The operation electrode is located outside the detection region in a state where the transparent electrode sheet overlaps the touch panel. The detection electrode is electrically connected to the operation electrode and is located inside the detection region in the state where the transparent electrode sheet overlaps the touch panel.

In the electronic device, an operation input to the operation electrode located outside the detection region is detected as an operation to the detection electrode located inside the detection region. In other words, an operation to an outside of the detection region of the touch panel is detected as an operation to a predetermined position in the detection region, that is, to a position where the detection electrode is formed. Thus, the operation input to the outside of the detection region of the touch panel can be detected without providing an additional wiring or a dedicated switch. In other words, a configuration for detecting the operation to the operation position located outside the detection region is applicable to a versatile design.

BRIEF DESCRIPTION OF THE DRAWINGS

Additional objects and advantages of the present disclosure will be more readily apparent from the following detailed description when taken together with the accompanying drawings. In the drawings:

FIG. 8A is a diagram showing an example of operation electrodes; and

FIG. 8B is a diagram showing another example of operation electrodes.

DETAILED DESCRIPTION

Figure 1:
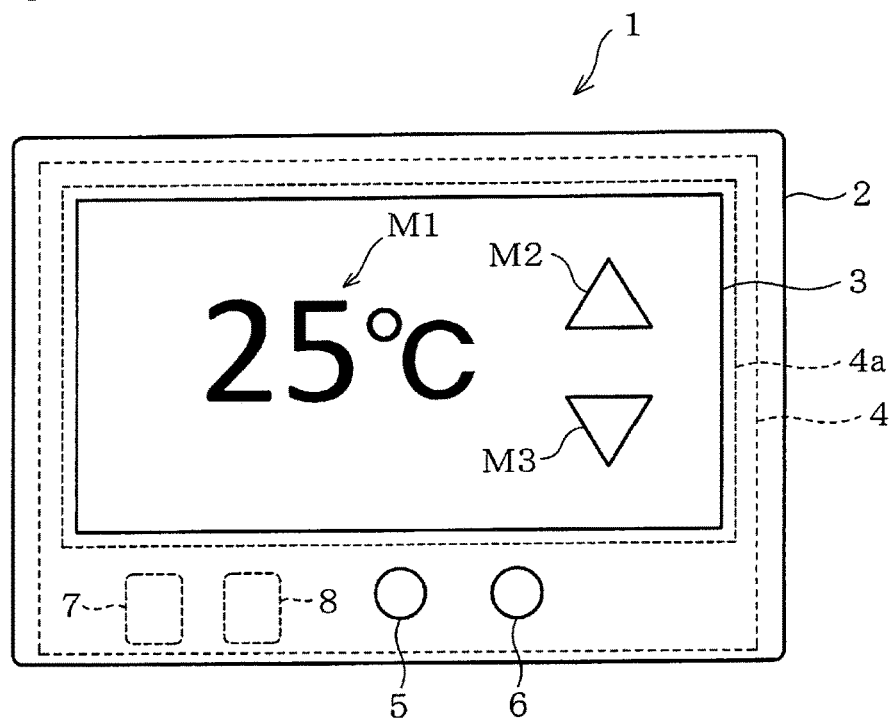
FIG. 1 is a diagram showing an appearance of an electronic device according to an embodiment.

The following describes an electronic device 1 according to an embodiment of the present disclosure with reference to FIG. 1 to FIG. 5. In the present embodiment, as shown in FIG. 1, the electronic device 1 includes a body 2, a display portion 3, a touch panel 4, an operation button 5, an operation button 6, a touch panel IC 7, and a control portion 8. The electronic device 1 according to the present embodiment is assumed to be an operation terminal for inputting an operation for turning on and off and setting a temperature of an air conditioner. However, the electronic device 1 according to the present disclosure is not limited to the operation terminal of the air conditioner and may be any device including a touch panel 4 to which an operation of a user is input.

The display portion 3 is made of, for example, a liquid crystal display. In a display region of the display portion 3, a temperature display region M1, a temperature rise button M2, and a temperature fall button M3 are previously set. The temperature rise button M2 and the temperature fall button M3 correspond to operation positions at which a user inputs operations. That is, in a detection region 4$a$ of the touch panel 4, multiple operation positions to which operations are input are predetermined.

The detection region 4$a$ of the touch panel 4 is provided so as to correspond to the display region. Thus, the user can change the temperature of the air conditioner by touch operations of the temperature rise button M2 and the temperature fall button M3. That is, the temperature rise button M2 and the temperature fall button M3 correspond to operation positions to which an operation is independently input in normal usage.

The touch panel 4 has a size substantially similar to a front surface of the body 2. The touch panel 4 is disposed in such a manner that the detection region 4$a$ overlaps the display region of the display portion 3. A portion of the touch panel 4 other than the detection region 4$a$ is used as a wiring space for connecting the detection region 4$a$ and the touch panel IC 7. When the user touches the detection region 4$a$, the touch panel 4 detects a position touched by the user by a change of an electrostatic capacity. The detection region 4$a$ of the touch panel 4 corresponds to an operation region to which the user inputs an operation.

Information about the operation by the user, which is detected by the touch panel 4, is transmitted to the control portion 8. The control portion 8 controls the whole of the electronic device 1. In addition, based on the operation by the user, the control portion 8 generates and outputs an operation instruction to the air conditioner which is not shown. The electronic device 1 includes the operation button 5 and the operation button 6 as operation positions to which the user inputs operations. The operation button 5 and the operation button 6 are located outside the detection region 4$a$ of the touch panel 4.

A conventional configuration will be briefly described below. In the conventional configuration, an operation to an operation position located outside the detection region 4$a$ of the touch panel 4, such as the operation button 5 and the operation button 6, is detected, for example, by a dedicated switch. This is because the operation position is located outside the detection region 4$a$ and the operation cannot be detected by the touch panel 4.

An operation position provided outside the detection region 4$a$ is not common among all customers and the number or a position of the operation position may be different for each customer. In another case, an operation position outside the detection region 4$a$ may be unnecessary. Thus, even when operation positions are provided at positions shown in FIG. 1 and an electronic device is configured to detect operations to the operation positions, there is a possibility that the electronic device cannot meet the request of another customer. In other words, it is difficult to apply an operation position located outside the detection region 4$a$ to a versatile design.

Figure 2:
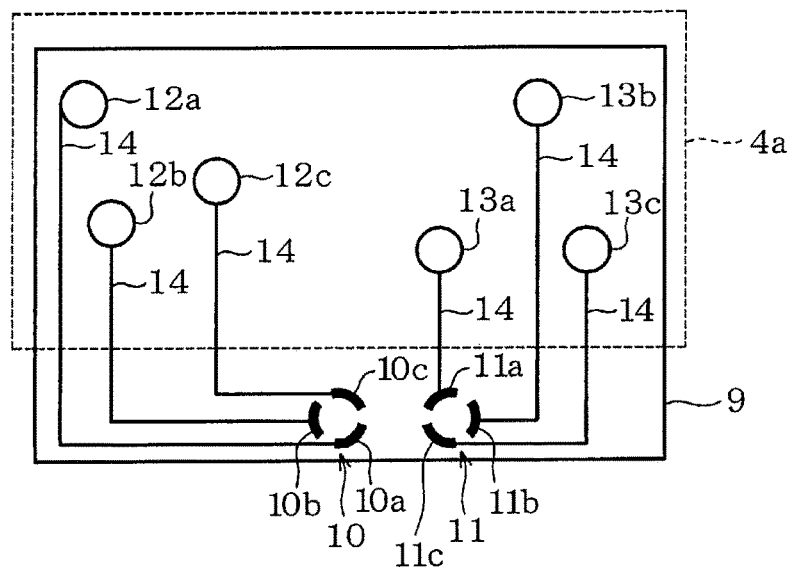
FIG. 2 is a diagram showing am example of a transparent electrode sheet.

Thus, in the present embodiment, a configuration for detecting the operation positions located outside the detection region 4$a$ is applied to a versatile design as described below. FIG. 2 is a diagram showing an example of a transparent electrode sheet 9 according to the present embodiment. Although each electrode is illustrated for explanation in FIG. 2, in the actual transparent electrode sheet 9, each of the electrodes and wirings connecting the electrodes are transparent.

The transparent electrode sheet 9 includes a transparent sheet which is formed into a sheet shape, for example, from a transparent resin material. At least a part of the transparent electrode sheet 9 overlaps the detection region 4$a$ of the touch panel 4. On the transparent sheet of the transparent electrode sheet 9, a plurality of electrodes (e.g., operation electrodes 10, 11 and detection electrodes 12, 13 described below) made of a transparent conductive material such as indium tin oxide (ITO) is formed. The electrodes are connected via wiring patterns 14 made of a transparent conductive material.

In the present embodiment, on the transparent sheet of the transparent electrode sheet 9, the operation electrodes 10, 11, the detection electrodes 12, 13, and the wiring patterns 14 electrically connecting the operation electrodes 10, 11 and the detection electrodes 12, 13 are formed. In a state where the transparent electrode sheet 9 overlaps the touch panel 4, the operation electrodes 10, 11 are located outside the detection region 4$a$ of the touch panel 4, and the detection electrodes 12, 13 are located inside the detection region 4$a$ of the touch panel 4. Because the electrodes and the wiring patterns 14 are formed as a transparent conductive film, a display of the display portion 3 is not disturbed by the electrodes and the wiring patterns 14.

Figure 3:
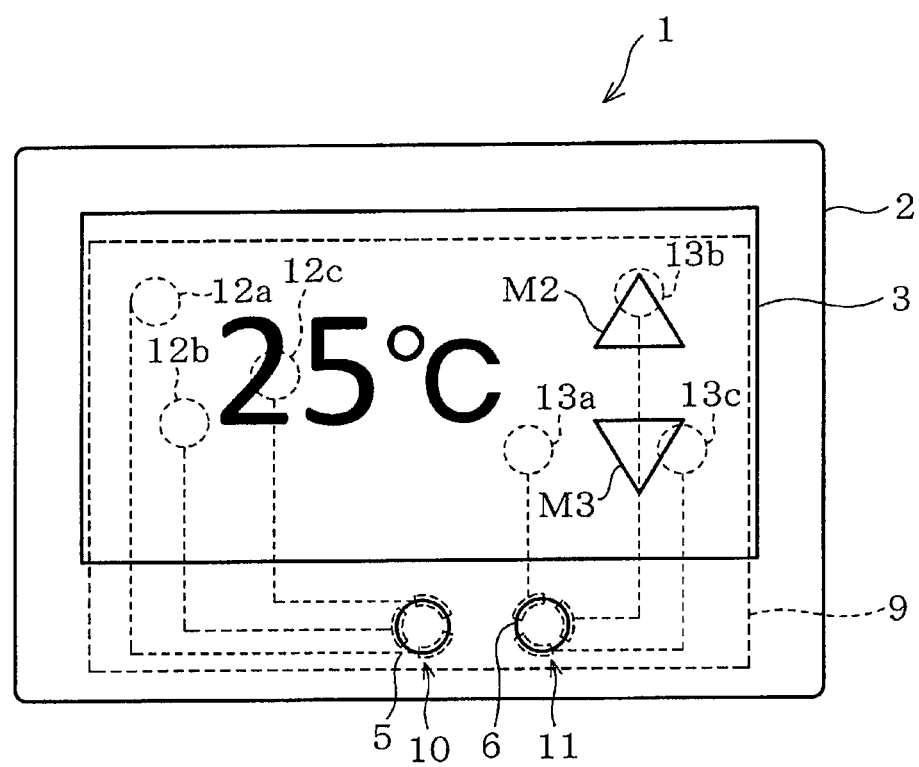
FIG. 3 is a diagram showing a positional relationship among a detection region, operation electrodes, and detection electrodes.

As shown in FIG. 3, the operation electrode 10 is formed at a position corresponding to the operation button 5 in a state where the transparent electrode sheet 9 is attached to the body 2. In the present embodiment, the operation electrode 10 includes electrode pieces 10$a$-10$c$ as shown in FIG. 2. The electrode pieces 10$a$-10$c$ are adjacent to each other in a range smaller than a human fingertip. In other words, the operation electrode 10 is formed as an assembly of the electrode pieces 10$a$-10$c$.

The electrode pieces 10$a$-10$c$ are electrically insulated from each other. As a size of the human fingertip, a statistical value may be used. In the present embodiment, the electrode pieces 10$a$-10$c$, and electrode pieces 11$a$-11$c$ are formed in a range equal to or less than 10 mm in diameter.

The electrode pieces 10$a$-10$c$ are connected to three detection electrodes 12$a$-12$c$. That is, the multiple detection electrodes 12$a$-12$c$ are provided with respect to the one operation electrode 10. More specifically, the electrode piece 10$a$ is connected to the detection electrode 12$a$, the electrode piece 10$b$ is connected to the detection electrode 12$b$, and the electrode piece 10$c$ is connected to the detection electrode 12$c$. The detection electrodes 12$a$-12$c$ are disposed at positions different from the operation positions of the temperature rise button M2 and the temperature fall button M3.

Each of the detection electrodes 12$a$-12$c$ has a size similar to a touch by a human finger. The detection electrodes 12$a$-12$c$ are separated from each other so that more than one electrode is not pressed by one finger at the same time. The detection electrodes 12$a$-12$c$ and detection electrodes 13$a$-13$c$ described below can be formed at any positions in the detection region 4$a$.

Similarly, as shown in FIG. 3, the operation electrode 11 is formed at a position corresponding to the operation button 6 in a state where the transparent electrode sheet 9 is attached to the body 2. In the present embodiment, the operation electrode 11 includes electrode pieces 11$a$-11$c$ as shown in FIG. 2. The electrode pieces 11a-11c are adjacent to each other in a range smaller than the human fingertip. In other words, the operation electrode 11 is formed as an assembly of the electrode pieces 11a-11c. The electrode pieces 11a-11c are electrically insulated from each other.

The electrode pieces 11a-11c are connected to three detection electrodes 13a-13c. That is, the multiple detection electrodes 13a-13c are provided with respect to the one operation electrode 11. More specifically, the electrode piece 11a is connected to the detection electrode 13a, the electrode piece 11b is connected to the detection electrode 13b, and the electrode piece 11c is connected to the detection electrode 13c.

Each of the detection electrodes 13a-13c has a size similar to the touch by the human finger. The detection electrodes 13a-13c are separated from each other so that more than one electrode is not pressed by one finger at the same time. In the detection electrodes 13a-13c, the detection electrode 13a is disposed at a position different from the operation positions of the temperature rise button M2 and the temperature fall button M3, and the detection electrodes 13b, 13c are disposed at positions overlapping the operation positions.

Next, an operation of the above-described configuration will be described. When the electronic device 1 detects an operation to the detection region 4a, the electronic device 1 carries out a processing corresponding to the detected operation. For example, when the electronic device 1 detects that the temperature rise button M2 is operated, the electronic device 1 outputs a temperature change instruction to the air conditioner. In other words, the electronic device 1 can detect the operation to the detection region 4a. It is similar in case of a versatile design on the assumption that an operation is input by the touch panel 4.

In the electronic device 1 according to the present embodiment, an operation to the outside of the detection region 4a is associated with an operation to the detection region 4a using the transparent electrode sheet 9. The operation electrode 10 formed on the transparent electrode sheet 9 is electrically connected to the detection electrode 12. Thus, a case that the user operates the operation electrode 10 is substantially the same situation as a case of operating the detection electrode 12. In addition, the operation electrode 11 is electrically connected to the detection electrode 13. Thus, a case that the user operates the operation electrode 11 is substantially the same situation as a case of operating the detection electrode 13.

The operation electrode 10 is formed at a position corresponding to the operation button 5 provided outside the detection region 4a, and the detection electrode 12 is formed at a position inside the detection region 4a. The operation electrode 11 is formed at a position corresponding to the operation button 6 provided outside the detection region 4a, and the detection electrode 13 is formed at a position inside the detection region 4a.

Figure 4:
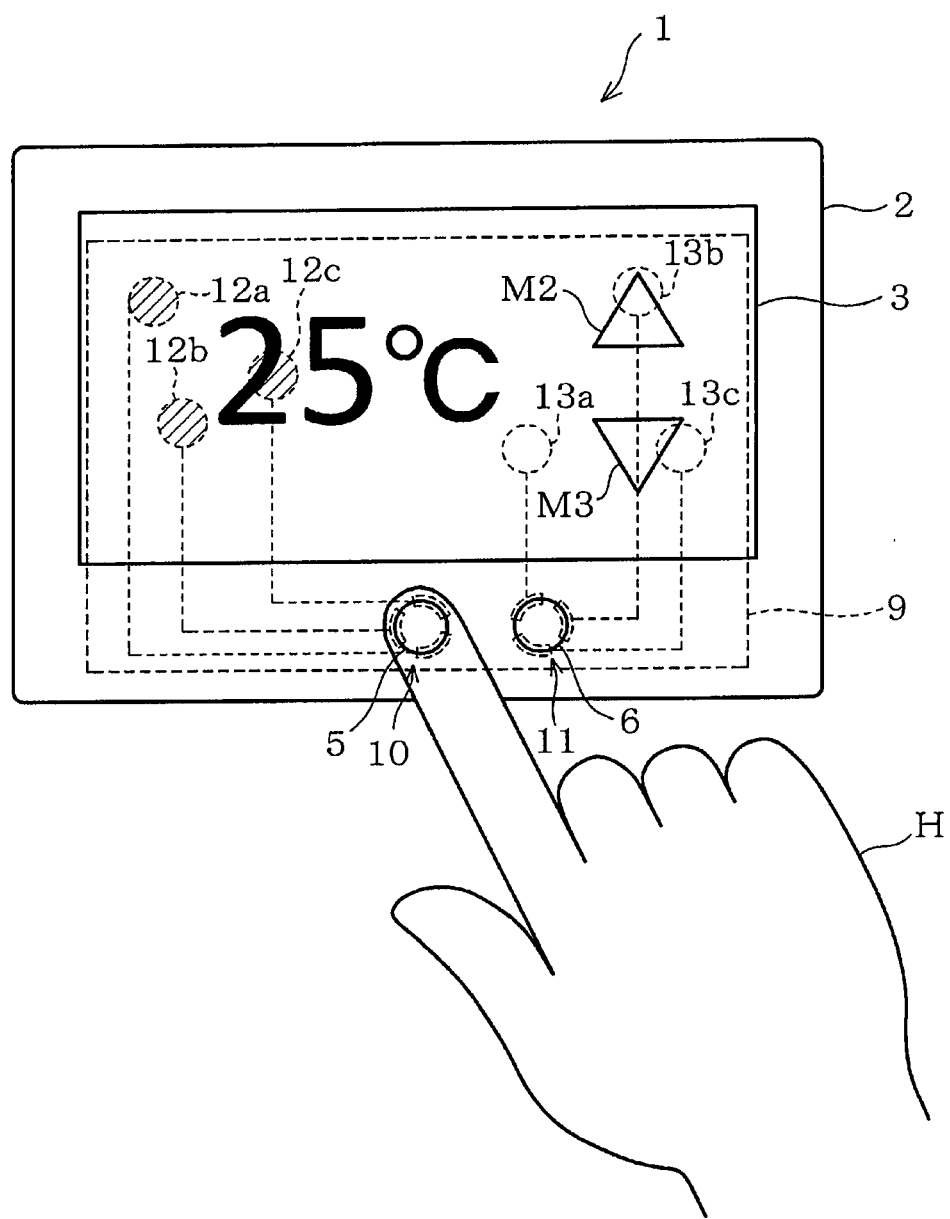
FIG. 4 is a diagram showing an operation state.

Thus, when the user operates the operation button 5 provided outside the detection region 4a, the operation is detected as a state that the three detection electrodes 12a-12c are operated at the same time, as shown in FIG. 4. In FIG. 4, the state that the detection electrodes 12a-12c are operated at the same time is schematically indicated by hatching.

Figure 5:
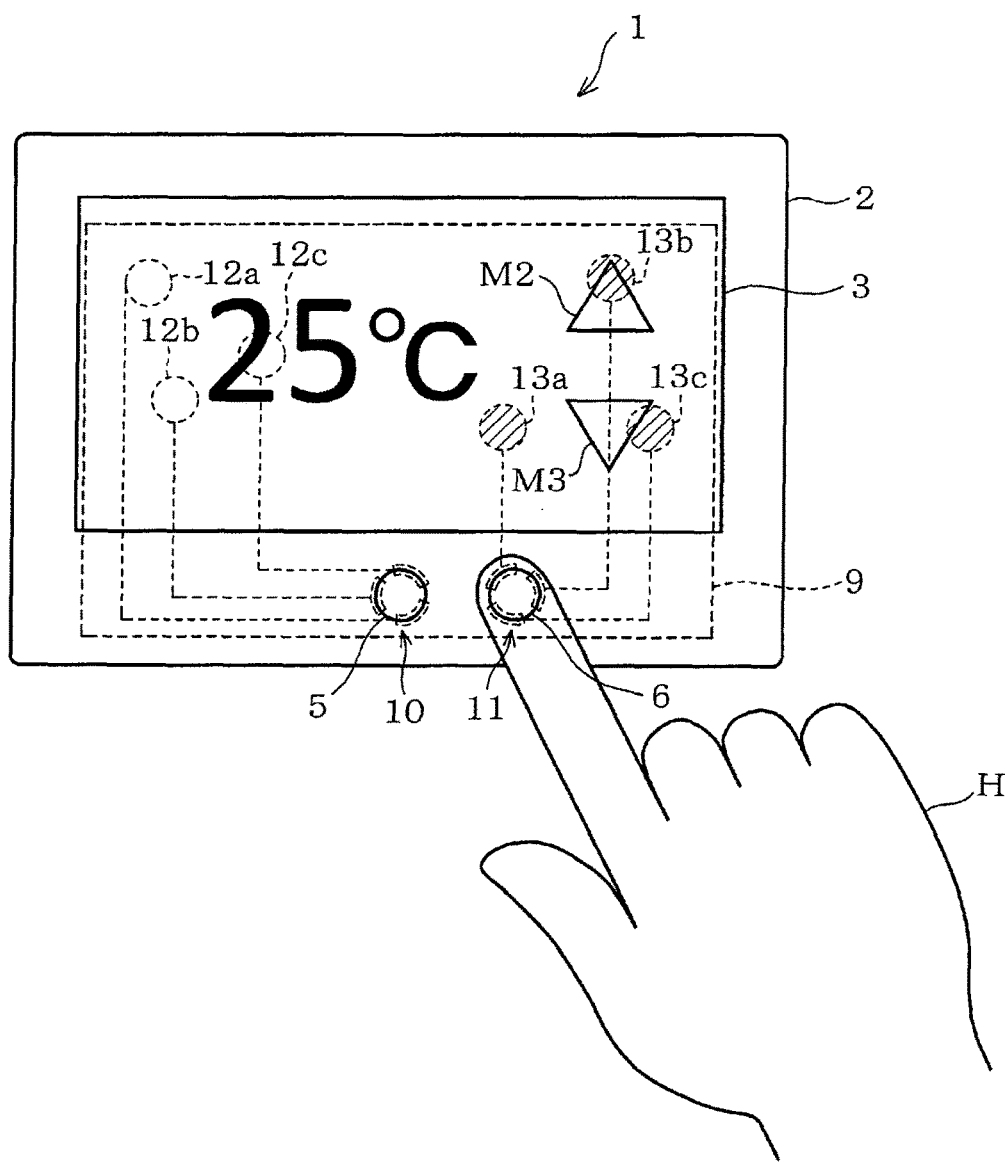
FIG. 5 is a diagram showing an operation state.

Similarly, when the user operates the operation button 6 provided outside the detection region 4a, the operation is detected as a state that the three detection electrodes 13a-13c are operated at the same time, as shown in FIG. 5. In FIG. 5, the state that the detection electrodes 13a-13c are operated at the same time is schematically indicated by hatching. As described above, in the electronic device 1, an operation input outside the detection region 4a of the touch panel 4 is associated with an operation to a predetermined region in the detection region 4a.

According to the present embodiment, the following effects can be obtained. The electronic device 1 includes the touch panel 4 and the transparent electrode sheet 9. The touch panel 4 has the detection region 4a which is predetermined and detects an operation by an electrostatic capacitance system. The transparent electrode sheet 9 is disposed in such a manner that at least a part of the transparent electrode sheet 9 overlaps the detection region 4a of the touch panel 4. In the transparent electrode sheet 9, the operation electrodes 10, 11 and the detection electrodes 12, 13 made of the transparent conductive material are formed on the transparent sheet. In the state where the transparent electrode sheet 9 overlaps the touch panel 4, the operation electrodes 10, 11 are located outside the detection region 4a, and the detection electrodes 12, 13 are located inside the detection region 4a and are electrically connected to the operation electrodes 10, 11, respectively.

Thus, the operation input to the operation electrode 10 as the operation position outside the detection region 4a can be detected as the operation to the detection electrode 12 inside the detection region 4a. Similarly, the operation input to the operation electrode 11 as the operation position outside the detection region 4a can be detected as the operation to the detection electrode 13 inside the detection region 4a. That is, the operations to the outside of the detection region 4a of the touch panel 4 can be detected as the operations to the predetermined positions in the detection region 4a (i.e., the positions where the detection electrodes 12, 13 are formed).

Thus, the operations to the outside of the detection region 4a can be detected without providing an additional wiring or a dedicated switch. In other words, the configuration for detecting the operations to the operation positions outside the detection region 4a of the touch panel 4 is applicable to the versatile design. The transparent electrode sheet 9 is formed into a thin sheet shape. Thus, even when the transparent electrode sheet 9 is overlapped on the touch panel 4, a major change of a hardware is not necessary. Thus, the cost does not increase significantly.

The operation electrodes 10, 11 and the detection electrodes 12, 13 are made of the transparent conductive material. Thus, even when the detection region 4a overlaps the display region of the display portion 3 as the electronic device 1 according to the present embodiment, the display is not disturbed. Even when the number or the positions of the operation buttons 5, 6 are changed according to a request from a customer, the electronic device 1 can meet the request by changing the transparent electrode sheet 9. Thus, compared with a configuration providing a dedicated switch or the like, the electronic device 1 can meet the request from the customer with a significantly lower cost.

An operation to the electronic device 1 such as a case where the temperature rise button M2 or the temperature fall button M3 is operated, the operation is input to a predetermined position where an icon is provided in the detection region 4a (a predetermined coordinate in the detection region 4a). Even if an operation input position slightly shifts due to an operation mistake, basically, the operation is input to one position. Thus, it is unlikely that the detection electrodes 12a-12c are operated at the same time in the normal operation.

Thus, by connecting the one operation electrode to the multiple detection electrodes, the normal operation input to the detection region 4a, and the operation to the operation electrode can be discriminated. In addition, in the present embodiment, the operation electrode includes the multiple electrode pieces and each of the electrode pieces is connected to the detection electrode. For example, as shown in FIG. 2, the operation electrode 11 includes the electrode pieces 11a-11c, and the electrode pieces 11a-11c are respectively connected to the detection electrodes 13a-13c.

In the above-described configuration, even if the detection electrode 13b overlaps the temperature rise button M2 as shown in FIG. 5, it is not considered that the detection electrodes 13a, 13c are operated when only the detection electrode 13b is operated. In other words, by forming the operation electrode from multiple electrode pieces, the operation input to the operation electrode is detected as the operation input to multiple positions in the detection region 4a while the operation input to the detection region 4a is detected as the operation to one position.

Accordingly, the normal operations input to the detection region 4a and the operations input to the operation electrodes can be discriminated. Even if the detection electrode 13b overlaps the temperature rise button M2 and the user touches the detection electrode 13b when operating the temperature rise button M2, a control problem does not occur.

The configuration including the transparent electrode sheet 9 is meaningful for the electronic device 1 in which the detection region 4a of the touch panel 4 is provided to correspond to the display region of the display portion 3. For example, as shown in FIG. 1, a configuration in which the detection region 4a is set to correspond to the display region of the display portion 3 is supposed.

In this case, if only one detection electrode is connected with respect to one operation electrode, the detection electrode needs to be formed so as to avoid icons displayed in the display portion 3. However, positions or sizes of the icons may be changed for each product. Thus, if one detection electrode is connected with respect to one operation electrode, there is a possibility that a position of the detection electrode needs to be changed for each product. The position of the detection electrode does not always need to be changed even when a type of a product is different.

On the other hand, as the present embodiment, when multiple detection electrodes are connected with respect to one operation electrode, and the operation electrode is formed of multiple electrode pieces, the normal operation and the operation to the operation electrode can be discriminated. Thus, the operation to the operation electrode can be detected regardless of types of products.

In addition, the operations to the operation buttons 5, 6 can be detected without changing processes of detecting the operations to the icons, the temperature rise button M2 or the like. In other words, the operations to the operation electrodes can be detected without changing a main program.

When the positions where the detection electrodes are formed (the coordinates in the detection region 4a) are fixed, the versatility of the software can be enhanced. This is because when the positions of the detection electrodes are fixed, the coordinates of detection objects are the same even when types of products are different, and a routine for detecting whether an operation is input can be modularized.

Figure 6:
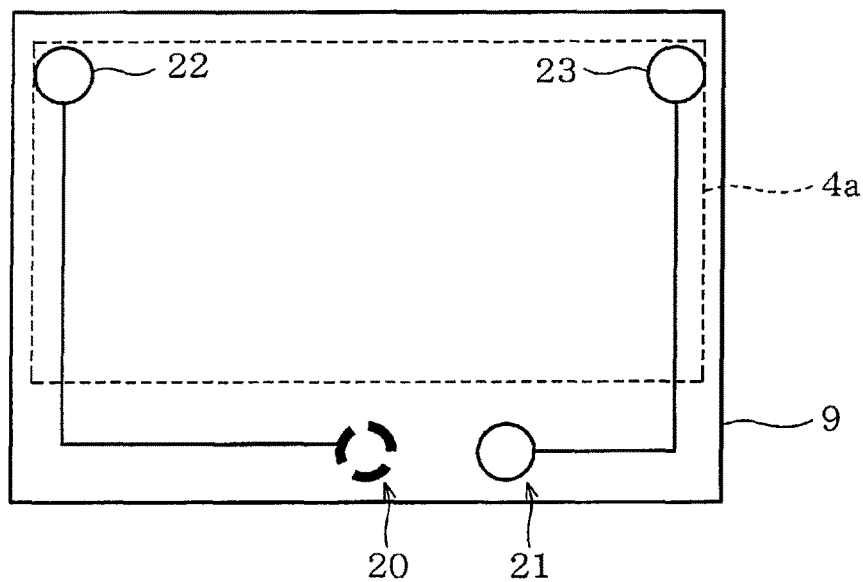
FIG. 6 is a diagram showing another example of a transparent electrode sheet.

The present disclosure is not limited to the embodiment described above with reference to the drawings, and various modifications and expansions can be made without departing from the scope of the present disclosure as defined in the appended claims. In the above-described embodiment, the multiple detection electrodes 12a-12c are formed with respect to the one operation electrode 10, and the multiple detection electrodes 13a-13c are formed with respect to the one operation electrode 11. In another embodiment, one operation electrode may be formed with respect to one operation electrode. In this case, the detection electrode may be formed at a position where the user is unlikely to touch. For example, as shown in FIG. 6, a detection electrode 22 connected to an operation electrode 20 may be formed at a left upper corner of the detection region 4a, and a detection electrode 23 connected to an operation electrode 21 may be formed at a right upper corner of the detection region 4a.

In other words, as shown in FIG. 3, in a case where the operation positions to which the operations are input (e.g., the temperature rise button M2 and the temperature fall button M3) are predetermined, the detection electrode may be formed at a position different from the operation positions, for example, as the detection electrode 12a. When the operation electrode is operated, an operation to a non-display region different from the region where the icons are displayed are detected. Thus, it can be determined that the operation electrode is operated.

In addition, because the detection electrodes 22, 23 are disposed at the left upper corner and the right upper corner of the display region 4a where the user is unlikely to touch, a possibility that an operation to the operation electrodes 20 or 21 is detected as an operation to the operation button can be reduced. In other words, because it is determined that the operation electrode is operated when a position which is not operated in the normal operation is operated, a risk that the user operates the detection electrodes by error can be reduced. The detection electrodes may be formed at any portions inside the detection region 4a of the touch panel 4 and outside the display region of the display portion 3.

In a case where the multiple operation positions to which the operation is independently input (e.g., the temperature rise button M2 and the temperature fall button M3) are predetermined in the detection region 4a of the touch panel 4, as shown in FIG. 3, multiple detection electrodes may be respectively formed at the multiple operation positions to which the operation is independently input, for example, as the detection electrodes 13b, 13c.

In this case, when the operation electrode is operated, it is detected that the operation positions which are not operated at the same time in the normal operation are operated at the same time. Thus, it can be determined that the operation electrode is operated. Furthermore, a risk that the user operates the detection electrodes in the normal operation can be reduced, and a risk of a misdetection by the electronic device 1 can be reduced. Furthermore, even in a case where many operation buttons such as icons are provided and a margin portion, that is, a region where the icons are not displayed is small, the operation to the operation electrode can be detected.

As shown in FIG. 3, the detection electrodes may be respectively provided at the positions overlapping the predetermined operation positions (the detection electrodes 13b, 13c) and the position different from the operation position (the detection electrode 13a). In the normal operation, the user is unlikely to operate the margin portion while operating the operation position. Thus, when the detection electrodes are respectively provided at the positions overlapping the operation positions and the position different from the operation positions, a state different from the normal operation can be detected when the operation electrode is operated. Accordingly, a risk that the user operates the detection electrodes by error in the normal operation can be reduced, and a risk of a misdetection can be reduced.

Figure 7:
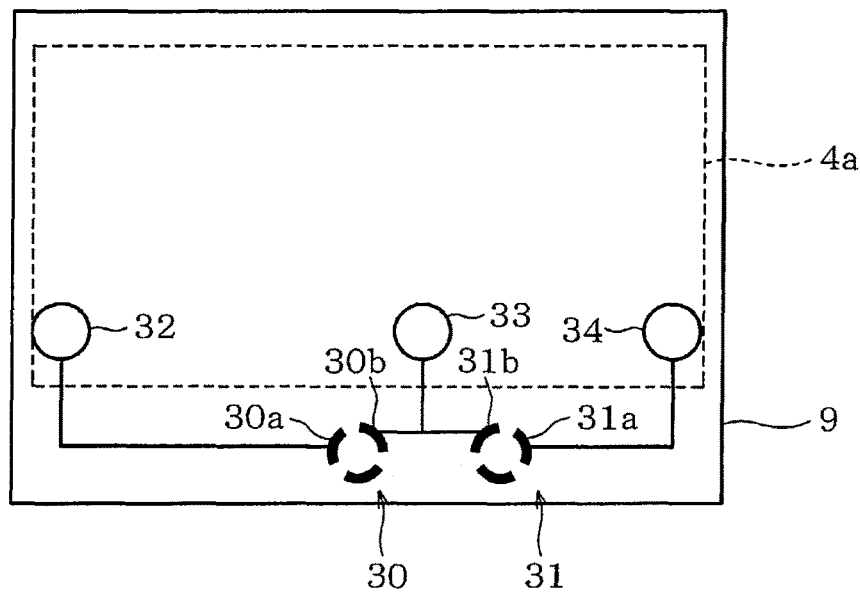
FIG. 7 is a diagram showing another example of a transparent electrode sheet.

In the above-described embodiment, the different detection electrodes are connected to the two operation electrodes. However, a part of the detection electrodes may be shared. In such a case, the operation electrodes and the detection electrodes are connected via different wiring patterns 14. For example, as shown in FIG. 7, an operation electrode 30 is formed of electrode pieces 30a-30c, an operation electrode 31 is formed of electrode pieces 31a-31c, and detection electrodes 32-34 are formed. The electrode piece 30a is connected to the detection electrode 32, and the electrode piece 30b is connected to the detection electrode 33. The electrode piece 31b is connected to the detection electrode 33, and the electrode piece 31a is connected to the detection electrode 33.

In this case, an operation input to the operation electrode 30 is detected as an operation to the detection electrodes 32, 33. On the other hand, an operation to the operation electrode 31 is detected as an operation to the detection electrodes 33, 34. In other words, even in a configuration in which a part of the detection electrodes is shared, it can be determined which operation electrode is operated.

In the above-described embodiment, the electrode pieces having shapes obtained by dividing a circle are described as an example. However, the shapes of the electrode pieces are not limited. In an example shown in FIG. 8A, an operation electrode 50 is formed of electrode pieces 50a, 50b having approximately triangle shapes, and the electrode pieces 50a, 50b are respectively connected to detection electrodes 51a, 51b. In this case, the electrode pieces 50a, 50b are disposed in a range a human hand H (more specifically, a fingertip) can touch at the same time. In another example shown in FIG. 8B, an operation electrode 60 is formed of electrode pieces 60a, 60b having approximately rectangular shapes, and the electrode pieces 60a, 60b are respectively connected to detection electrodes 61a, 61b.

In the above-described embodiment, the two operation electrodes 10, 11 are provided so as to correspond to the two operation buttons 5, 6. However, the number of the operation buttons and the number of the operation electrodes may be changed as necessary. For example, one operation electrode is provided when one operation button is necessary, and three operation electrodes are provided when three operation buttons are necessary.

The screen image shown in the above-described embodiment is an example, and the screen image is not limited. In the above-described embodiment, an example that the electronic device 1 includes the display portion 3 is described. However, the electronic device 1 does not need to include the display portion 3. Even in an electronic device that does not need a screen display as an electrostatic switch, an operation to an outside of a detection region of a touch panel can be detected.

What is claimed is:

1. An electronic device comprising:
a touch panel having a detection region which is predetermined and detecting an operation to a position in the detection region when the position is touched by a user;
a transparent electrode sheet having a transparent conductive material and having a transparent sheet that is disposed in such a manner that at least a part of the transparent sheet overlaps the detection region of the touch panel; and
an operation button disposed outside the detection region, wherein:
the transparent sheet includes an operation electrode and a plurality of detection electrodes,
the operation electrode is located outside the detection region and is located at a position corresponding to the operation button in a state where the transparent electrode sheet overlaps the touch panel, and the operation electrode is formed as an assembly of a plurality of electrode pieces electrically insulated from each other,
the plurality of detection electrodes are electrically connected to the plurality of electrode pieces, respectively, and are located inside the detection region and are located in a display region in the state where the transparent electrode sheet overlaps the touch panel, and
an operation to the operation button is detected as a state that the plurality of detection electrodes are operated at the same time via the plurality of electrode pieces.

2. The electronic device according to claim 1, wherein the plurality of electrode pieces are respectively connected to the plurality of detection electrodes by wiring patterns, the wiring patterns being different from each other.

3. The electronic device according to claim 1, wherein an operation position to which an operation is input is predetermined inside the detection region of the touch panel, and each of the plurality of detection electrodes is located at a position different from the operation position.

4. The electronic device according to claim 1, wherein a plurality of operation positions to which an operation is independently input is predetermined inside the detection region of the touch panel, and the plurality of detection electrodes are located at positions corresponding to the plurality of operation positions.

5. The electronic device according to claim 1, wherein an operation position to which an operation is input is predetermined inside the detection region of the touch panel, one of the plurality of detection electrodes is located at a position overlapping the operation position, and another of the plurality of detection electrodes is located at a position different from the operation position.

6. The electronic device according to claim 1, further comprising:
a display portion overlapping the detection region of the touch panel, wherein:
the display portion includes the display region, and
the non-display region of the electronic device is defined as a surface other than the display region of the electronic device.

7. The electronic device according to claim 1, wherein the plurality of electrode pieces are disposed in a range equal to or less than 10 mm in diameter.

* * * * *